Jan. 27, 1925.
R. M. TEMPLE
TIRE
Filed Oct. 27, 1923
1,524,114
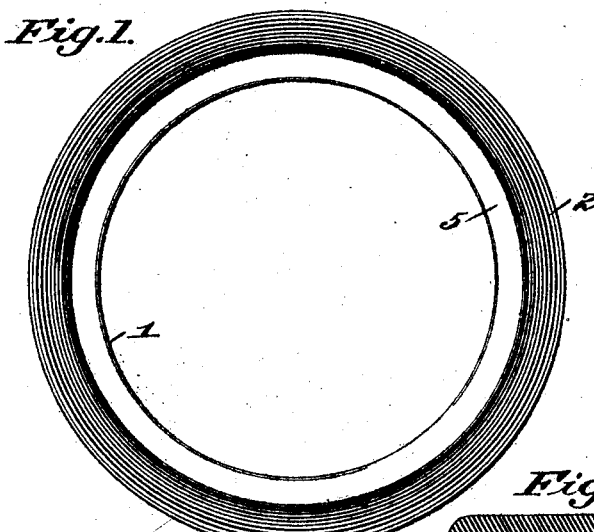
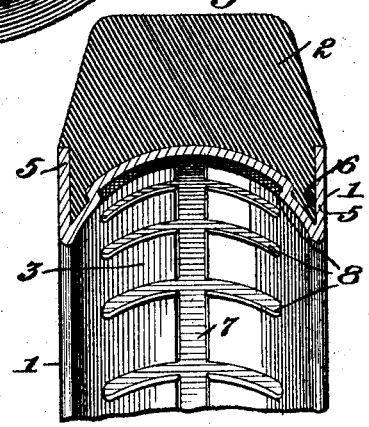
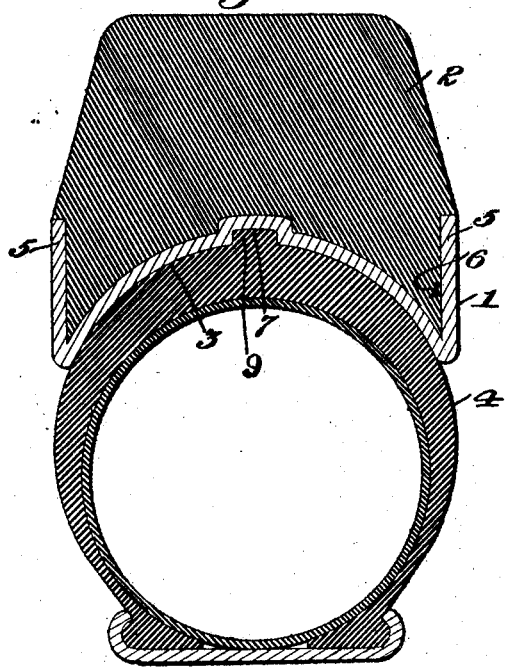
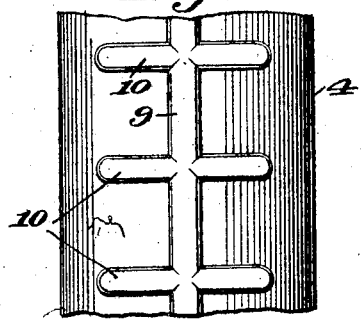
Inventor:
Roger M. Temple,
By Geo. A. Hutchinson,
Att'y.

Patented Jan. 27, 1925.

1,524,114

UNITED STATES PATENT OFFICE.

ROGER M. TEMPLE, OF AKRON, OHIO.

TIRE.

Application filed October 27, 1923. Serial No. 671,247.

*To all whom it may concern:*

Be it known that I, ROGER M. TEMPLE, a citizen of the United States, residing at Akron, in the county of Summit and State of Ohio, have invented certain new and useful Improvements in Tires, of which the following is a full, clear, and exact specification.

This invention relates to tires for automobiles and other vehicles and has for its object to provide a solid or cushion tire to be mounted on an ordinary pneumatic tire for protecting the latter from wear and puncture.

The invention contemplates the provision of a solid tire which is molded upon and carried by a continuous channeled hoop-like rim adapted to fit around the tread of an ordinary pneumatic tire to which it may be applied when the latter is deflated, and on which it is retained by the tread portion of said pneumatic tire engaging in the channel of said rim when said tire is inflated. The solid tire and the rim on which it is molded may be applied to pneumatic tires having anti-skid treads, and the internal face of the channel in said rim may be grooved to correspond with the ribs or projections on said anti-skid tread of the pneumatic tire. When the solid tire is applied to the pneumatic tire, the grooves in the rim, which carries said solid tire, will interlock with the ribs on the tread of the tire and serve to retain the former against creeping or sliding laterally on the latter.

The invention will be first hereinafter described in connection with the accompanying drawings, which constitute part of this specification, and then more specifically defined in the claims at the end of the description.

In the accompanying drawings, wherein similar reference characters are used to designate corresponding parts throughout the several views:

Figure 1 is a side elevation of a solid tire and rim carrying the same as they may be made and sold for use around pneumatic tires.

Figure 2 is a transverse section of said solid tire and its rim.

Figure 3 is a cross-section of said solid tire and rim applied to a pneumatic tire, and Figure 4 is a plan view of a section of the tread of the pneumatic tire showing an arrangement of ribs thereon adapted to fit in the grooves in the channel of the rim of the solid tire.

The rim 1, on which the solid tire 2 is molded, is made of metal or other rigid material in the form of a continuous ring or hoop which has its inner face channeled at 3 to fit the tread of a pneumatic tire 4. Said rim 1 is also provided with outwardly extending flanges 5 at its lateral edges forming with the internally channel portion 3, an outer channel 6, in which the solid tire 2 is molded and by which it is retained in place on said rim.

The internal channel on the rim 1 has a longitudinal groove 7 and spaced transverse grooves 8 formed therein to fit a longitudinal rib 9 and transverse ribs 10 on the tread of the pneumatic tire 4. When the pneumatic tire is deflated, the rim 1, carrying the solid tire 2, may be slipped over the tread of said pneumatic tire, and when the latter is inflated, said tread portion thereof fills the internal channel in said rim, as shown in Figure 3. As the pneumatic tire is inflated, the rim 1 is brought into position so that its longitudinal groove 7 and transverse grooves 8 will be engaged by the longitudinal rib 9 and transverse ribs 10, respectively, on the tread of the pneumatic tire 4. When said ribs are engaged with said grooves, and the pneumatic tire is fully inflated, as in Figure 3, the interlocking of said ribs and grooves will effectively prevent the rim 1 from creeping around or moving laterally upon the pneumatic tire.

It will be understood that the particular arrangement of longitudinal and transverse grooves and ribs shown in the drawings constitutes only one example of the manner in which the solid tire may be retained in place on the pneumatic tire. It is obvious that the internal channel of the rim of the solid tire may be grooved or otherwise formed to correspond with any anti-skid tread formed on a pneumatic tire, so that the solid tire mounted on its rim, as illustrated in Figures 1 and 2, may be made to fit any or all of the various types of anti-skid pneumatic tires. It will also be noted that the solid tire and its rim constitute an effective means of protecting the pneumatic tire from wear and puncture, so that a pneumatic tire may be made to last substantially as long as the automobile or other vehicle on which it is used, by the addition of said solid tire and rim thereto.

I claim:

1. The combination with a solid tire for use on a pneumatic tire, of a continuous rigid hoop-like rim carrying said solid tire and having an internal channel to fit the tread of a pneumatic tire, said channel portion of the rim having longitudinal and transverse grooves to fit corresponding ribs on an anti-skid tread of the pneumatic tire.

2. The combination, with a pneumatic tire having an anti-skid tread consisting of a central continuous annular projecting rib and transverse projecting ribs extending at opposite sides of said annular rib, of a solid tire and a continuous rigid hoop-like rim carrying said solid tire and having an annular groove and transverse grooves therein to fit said annular and transverse ribs of the anti-skid tread of said pneumatic tire.

In testimony whereof I have signed my name to this specification.

ROGER M. TEMPLE.